United States Patent
Furuya et al.

[11] Patent Number: 6,101,674
[45] Date of Patent: Aug. 15, 2000

[54] GROMMET

[75] Inventors: Hiroyasu Furuya; Keiichiro Soma, both of Shizuoka, Japan

[73] Assignee: Yazaki Corporation, Tokyo, Japan

[21] Appl. No.: 09/298,844

[22] Filed: Apr. 26, 1999

[30] Foreign Application Priority Data

Apr. 24, 1998 [JP] Japan .................................. 10-115383

[51] Int. Cl.[7] ...................................................... F16L 5/00
[52] U.S. Cl. ......................................... 16/2.1; 174/153 G
[58] Field of Search .......................... 16/2.1, 2.2; 248/56; 174/153 G, 152 G, 65 G, 65 R, 153 R

[56] References Cited

U.S. PATENT DOCUMENTS

| | | | |
|---|---|---|---|
| 4,232,421 | 11/1980 | Tucker | 16/2.1 |
| 4,912,287 | 3/1990 | Ono et al. | 174/153 G |
| 5,453,579 | 9/1995 | Cohea | 16/2.1 |
| 5,499,823 | 3/1996 | Fukui | 16/2.1 |
| 5,531,459 | 7/1996 | Fukuda et al. | 174/153 G |
| 5,732,440 | 3/1998 | Wright | 16/2.2 |
| 5,774,934 | 7/1998 | Fujita et al. | 16/2.1 |
| 5,856,635 | 1/1999 | Fujisawa et al. | 16/2.1 |
| 5,981,877 | 11/1999 | Sakata et al. | 174/153 G |

*Primary Examiner*—Chuck Y. Mah
*Attorney, Agent, or Firm*—Sughrue, Mion, Zinn, Macpeak & Seas, PLLC

[57] ABSTRACT

In a conventional grommet, that portion of a tapering, reduced-diameter portion, extending from an insertion hole of a minimum diameter to an insertion hole of a maximum diameter, is linearly varying. Therefore, when enlarging the diameter of the reduced-diameter portion, a large diameter-enlarging force is required, and the efficiency of the operation is low. A grommet 21 of the invention includes a mounting base portion 27 of a different-diameter tubular shape having a larger outer-diameter portion 23 at one end thereof and a smaller outer-diameter portion 25 at the other end thereof, and an annular groove 31 for fitting on a peripheral edge of a hole, formed through a panel of a vehicle, is formed in an outer peripheral surface of the larger outer-diameter portion 23, and the interior of the mounting base portion 27 defines a passage space 29 for a wire harness. A cylindrical portion 33 is formed on and extends continuously from the smaller outer-diameter portion 25 of the mounting base portion 27, and an inner periphery of the cylindrical portion corresponds to a wire harness having a maximum outer diameter. A truncated cone-shaped portion 37 is formed on and extends continuously from a distal end of the cylindrical portion 33, and the truncated cone-shaped portion has an open distal end corresponding to a wire harness having a minimum outer diameter.

8 Claims, 3 Drawing Sheets

PRIOR ART

GROMMET

BACKGROUND OF THE INVENTION

1. Field of the Invention

This invention relates to a grommet for sealing a gap between a hole formed in a panel of a vehicle and a wire harness passing through the hole, and more particularly to a grommet which can fit on any one of wire harnesses of different diameters.

2. Related Art

When passing a wire harness through a panel of a vehicle, a grommet is used for preventing water, dust and so on from intruding through a gap between a through hole and the wire harness. One such grommet, disclosed in Japanese Patent Unexamined Publication No. Hei. 8-129918, will be described.

As shown in FIG. 4, this grommet 1 includes an enlarged-diameter portion 3 of a larger-diameter, conical tubular shape for mounting in a hole in a vehicle panel, and a reduced-diameter portion 5 of a smaller-diameter, cylindrical shape extending continuously from a smaller-diameter end of this enlarged diameter portion. An engagement groove 7 is formed in an outer peripheral surface of the enlarged-diameter portion 3, and an inner peripheral edge of the hole is adapted to fit in this engagement groove 7. The inner periphery of the enlarged-diameter portion 3 defines a passage hole 9 for loosely passing a wire harness therethrough. The reduced-diameter portion 5 has a generally conical tubular shape decreasing in diameter progressively toward its distal end from its proximal end continuous with the enlarged-diameter portion 3. Thick ribs 11 are formed on the outer peripheral surface of the reduced-diameter portion 5, and are spaced at predetermined intervals in the axial direction.

If the outer diameter of the wire harness, which is to be passed through the vehicle panel by the use of this grommet 1, is larger than an inner diameter A of the distal end of the reduced-diameter portion 5, the reduced-diameter portion 5 is cut at a required portion thereof by scissors, so that the inner diameter of the reduced-diameter portion 5 is brought into agreement with the outer diameter of the wire harness. Then, the reduced-diameter portion 5 is enlarged in diameter by a grommet-expanding machine, and the wire harness is passed through the grommet, and then an adhesive tape is wound on the reduced-diameter portion 5 and the wire harness, thereby fixing the grommet to the wire harness. In this condition, the engagement hole 7 in the grommet 1 is fitted on the peripheral edge of the vehicle panel, thus completing the assembling operation.

This grommet 1 has the reduced-diameter portion 5 of a generally conical tubular shape decreasing in diameter progressively toward the distal end thereof, and this reduced-diameter portion 5 is cut in accordance with the outer diameter of the wire harness. Therefore, one kind of grommet 1 can be suitably used for wire harnesses of different diameters.

In the above conventional grommet 1, however, that portion of the tapering, reduced-diameter portion, extending from the insertion hole of the minimum diameter A to an insertion hole of a maximum diameter B, is linearly varying. Therefore, in the case of enlarging the diameter of the reduced-diameter portion, the reduced-diameter portion must be enlarged in diameter over a long distance in the axial direction, and therefore a large diameter-enlarging force is required. As a result, there is encountered a problem that the efficiency of the operation is low.

And besides, the reduced-diameter portion must be cut in accordance with the outer diameter of the wire harness, and thus this additional cutting operation is required for the wire harness-passing operation.

Furthermore, there can be produced those grommets which can not be used because of cutting errors or the like.

SUMMARY OF THE INVENTION

With the above problems in view, it is an object of this invention to provide a grommet which requires no cutting operation, and can be mounted on any one of various wire harnesses of different outer diameters with a small diameter-enlarging force.

The above object of the present invention has been achieved by a grommet according to the present invention comprising:

a mounting base portion of a different-diameter tubular shape which includes a larger outer-diameter portion formed at one end thereof and a smaller outer-diameter portion at the other end thereof, the larger outer-diameter portion having an annular groove for fitting on a peripheral edge defined by a hole formed through a panel of a vehicle, the mounting base portion defining an insertion space for a wire harness;

a cylindrical portion extending continuously from the smaller outer-diameter portion of the mounting base portion in an axial direction of the mounting base portion; and a truncated cone-shaped portion extending continuously from a distal end of the cylindrical portion, the truncated cone-shaped portion having an open distal end having a diameter smaller than an inner diameter of the cylindrical portion.

With the above-mentioned grommet, the truncated cone-shaped portion is formed only at the distal end of the cylindrical portion, and it is not necessary to enlarge the diameter of the passage space over a long distance, so that the required diameter-enlarging force is small. Therefore, a cutting operation is not necessary, and besides the wire harness-passing operation can be effected easily.

In the above-mentioned grommet, it is preferable that the grommet is applicable for various kinds of wire harnesses having different diameters including a wire harness having a maximum diameter and a wire harness having a minimum diameter, in which the cylindrical portion having an inner diameter corresponding to the wire harness having the maximum diameter thereof, and the open distal end having an inner diameter corresponding to the wire harness having the minimum diameter.

In addition, in the grommet, it is advantageous that an annular rib is formed on a portion of an outer peripheral surface of the cylindrical portion where is disposed adjacent to the truncated cone-shaped portion.

With the grommet having this construction, when an adhesive tape is wound on the cylindrical portion and the wire harness to fix the grommet to the wire harness, the adhesive tape is engaged with the annular rib, so that the force of retaining of the adhesive tape is enhanced. Therefore, the adhesive tape is less liable to be dislodged from the grommet.

Further, in the grommet, it is also advantageous that the length of the truncated cone-shaped portion is smaller than the length of the cylindrical portion, and therefore the passage space is abruptly reduced only at the distal end portion. With this construction, the truncated cone-shaped portion can be fitted on any one of the wire harnesses of different outer diameters with a small diameter-enlarging force.

DESCRIPTION OF THE PREFERRED EMBODIMENT OF THE INVENTION

A preferred embodiment of a grommet of the present invention will now be described in detail with reference to the drawings.

Figure 1:
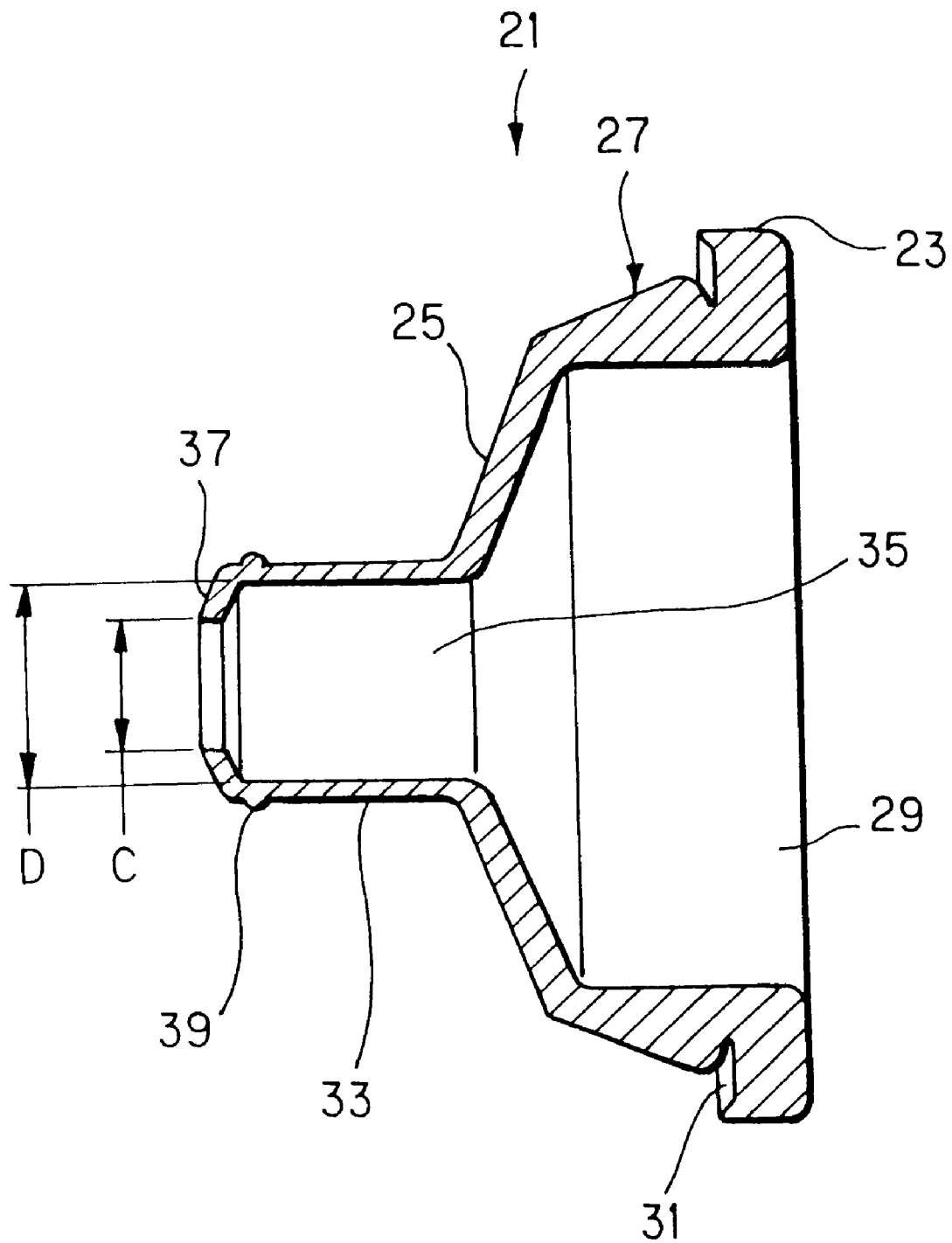
FIG. 1 is a cross-sectional view of a grommet of the present invention taken along an axis thereof.

FIG. 1 is a cross-sectional view of the grommet of the invention taken along an axis thereof.

The grommet 21 includes a mounting base portion 27 of a different-diameter tubular shape having a larger outer-diameter portion 23 at one end thereof and a smaller outer-diameter portion 25 at the other end thereof. The opposite ends of the mounting base portion 27, defined respectively by the larger outer-diameter portion 23 and the smaller outer-diameter portion 25, are open, and the interior of the mounting base portion 27 defines a base portion passage space 29 through which a wire harness (not shown) can be loosely passed. An annular groove 31 is formed in the outer peripheral surface of the larger outer-diameter portion 23. This annular groove 31 is fitted on an inner peripheral edge of a hole formed through a panel (not shown) of a vehicle, so that the mounting base portion 27 is mounted on the vehicle panel.

A cylindrical portion 33 is formed on and extends continuously from the smaller outer-diameter portion 25 of the mounting base portion 27, and an outer diameter of the cylindrical portion 33 is equal to an outer diameter of the distal end of the smaller outer-diameter portion 25. The cylindrical portion 33 is hollow, and has open opposite ends, and this cylindrical portion 33 extends outwardly from the smaller outer-diameter portion 25 in the direction of the axis of the mounting base portion 27. Therefore, the base portion passage space 29 in the mounting base portion 27 is open to a distal end of the cylindrical portion 33 through a passage space 35 in the cylindrical portion 33. The inner diameter of the cylindrical portion 33 corresponds to an outer diameter of the wire harness having the maximum outer diameter.

A truncated cone-shaped portion 37, having an open distal end, is formed on and extends continuously from the distal end of the cylindrical portion 33. The axial length of the truncated cone-shaped portion 37 is sufficiently smaller than that of the cylindrical portion 33. Namely, in this grommet 21, only the distal end portion of the cylindrical portion 33 is reduced in diameter, and is formed into the tapering, truncated cone-shaped portion 37.

Figure 4:
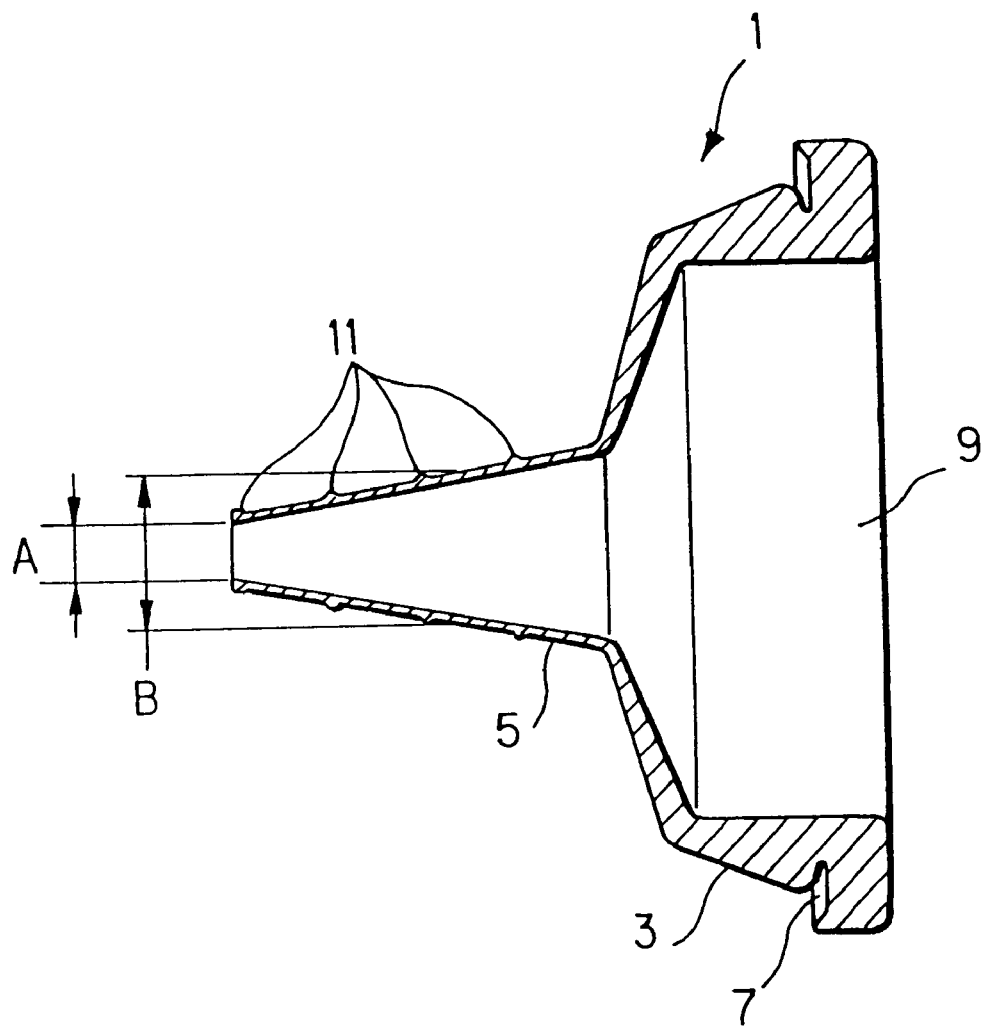
FIG. 4 is a cross-sectional view of a conventional grommet taken along an axis thereof.

In the conventional grommet described above in the Related Art, the reduced-diameter portion 5 (see FIG. 4) is formed into a conical tubular shape decreasing in diameter progressively toward the distal end thereof. On the other hand, in the grommet 21 of the present invention, most of that portion of this grommet, projecting from the mounting base portion 27, is defined by the cylindrical portion 33, and the truncated cone-shaped portion 37 is formed only at the distal end of this cylindrical portion. Namely, in the conventional grommet, the passage space is decreasing progressively whereas in the present invention, the passage space is abruptly reduced only at the distal end portion.

A thick annular rib 39 is formed on that portion of the outer peripheral surface of the cylindrical portion 33 disposed immediately adjacent to the truncated cone-shaped portion 37.

The grommet 21, including the mounting base portion 27, the cylindrical portion 33, the truncated cone-shaped portion 37 and the annular rib 39, is formed into an integral construction, using rubber having a high extensibility.

Next, the operation of the grommet 21 of this construction will be described.

Figure 2:
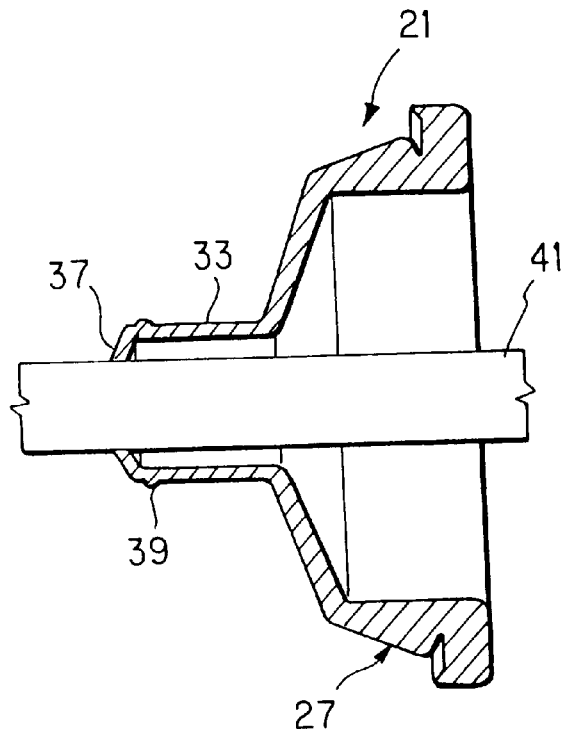
FIG. 2 is a cross-sectional view showing a condition in which a wire harness, having a minimum outer diameter, is passed through the grommet of FIG. 1.
Figure 3:
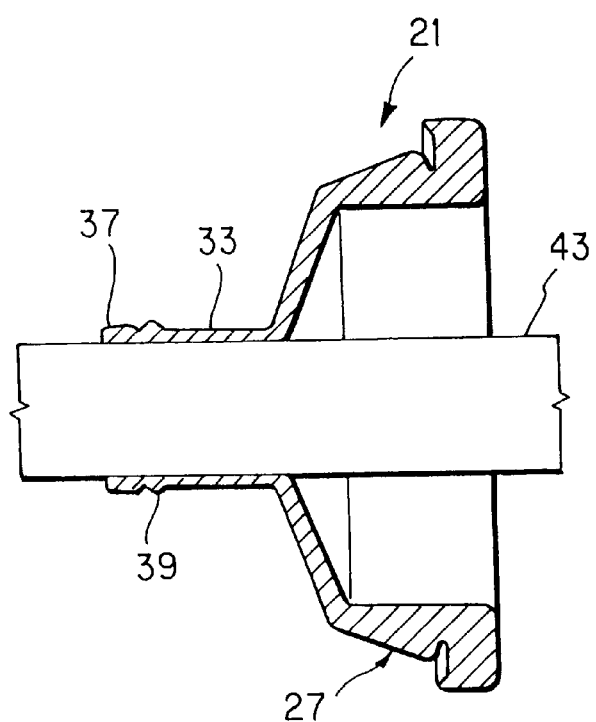
FIG. 3 is a cross-sectional view showing a condition in which a wire harness, having a maximum outer diameter, is passed through the grommet of FIG. 1.

FIG. 2 is a cross-sectional view showing a condition in which the wire harness, having the minimum outer diameter, is passed through the grommet of FIG. 1. FIG. 3 is a cross-sectional view showing a condition in which the wire harness, having the maximum outer diameter, is passed through the grommet of FIG. 1.

As shown in FIG. 2, when the wire harness 41, having the minimum outer diameter, is passed through the grommet 21, the peripheral edge of the open distal end of the truncated cone-shape portion 37 is held in intimate contact with the outer peripheral surface of the wire harness 41. As a result, a seal is formed between the grommet 21 and the wire harness 41.

As shown in FIG. 3, when the wire harness 43, having the maximum outer diameter, is passed through the grommet 21, the inner peripheral surface of the cylindrical portion 33 is held in intimate contact with the outer peripheral surface of the ware harness 43. At the same time, the inner periphery of the truncated cone-shaped portion 37 is expanded into a diameter equal to the inner diameter of the cylindrical portion 33, and is held in intimate contact with the outer diameter of the wire harness 43. As a result, a seal is formed between the grommet 21 and the wire harness 43.

Namely, the grommet 21 can be used for various wire harnesses having an outer diameter in the range of between a value C and a value D (see FIG. 1)

In this case, since the truncated cone-shaped portion 37 is provided only at the distal end of the cylindrical portion 33, the required diameter-enlarging force is small. Namely, in the conventional grommet, the reduced-diameter portion 5 is decreasing progressively from the larger-diameter portion to the smaller-diameter portion. Therefore, in order to enlarge the reduced-diameter portion 5 into the large diameter B, the reduced-diameter portion 5 must be enlarged generally over the entire length thereof, and therefore the large diameter-enlarging force is required. On the other hand, in the grommet 21 of the present invention, only the truncated cone-shaped portion 37, formed at the distal end of the cylindrical portion 33, need to be enlarged in diameter. Therefore, the diameter-enlarging force is much smaller as compared with that required for the conventional grommet.

When passing a wire harness having an outer diameter larger than the maximum outer diameter D, the cylindrical portion 33 is enlarged in diameter by a grommet-expanding machine as in the conventional construction, and by doing so, this wire harness can be passed through the grommet.

After the wire harness is passed through the grommet 21, an adhesive tape (not shown) is wound on the cylindrical portion 33 and that portion of the wire harness disposed adjacent to this cylindrical portion. At this time, the adhesive tape is wound on the annular rib 39, and therefore is less liable to be dislodged from the grommet 21. The annular rib 39 is sufficiently thick, and therefore when the wire harness, having an outer diameter larger than the maximum outer diameter, that portion of the cylindrical portion 33, having the annular rib 39 formed thereon, is held in intimate contact with the wire harness with a larger elastic force than the remainder of the cylindrical portion 33 is. Therefore, even when the cylindrical portion 33 is expanded or enlarged into a diameter larger than the maximum diameter, the high sealing effect can be secured.

As described above, in the grommet 21, the cylindrical portion 33 (which is equal in diameter to the distal end of the smaller outer-diameter portion 25) is formed on and extends continuously from the smaller outer-diameter portion 25 of the mounting base portion 27, and the truncated cone-shaped portion 37 is formed only at the distal end of the cylindrical portion 33. Therefore, when passing the wire harness through the grommet, the passage space 35 does not need to be expanded over a long distance, and the diameter-enlarging force can be reduced. As a result, the enlargement of the diameter is easy, and the efficiency of the wire harness-passing operation can be enhanced.

The annular rib 39 is formed on the outer peripheral surface of the cylindrical portion 33, and therefore when the adhesive tape is wound on the cylindrical portion 33 and the wire harness to fix the grommet to the wire harness, the force of retaining of the adhesive tape is increased. And besides, even when the cylindrical portion 33 is expanded into a diameter larger than the maximum outer diameter, a satisfactory seal between the cylindrical portion 33 and the wire harness can be secured because of the provision of the annular rib 39.

In the grommet of the above embodiment, although the thickness of the truncated cone-shaped portion 37 is generally equal to that of the cylindrical portion 33, the thickness of the truncated cone-shaped portion 37 may be smaller than that of the cylindrical portion 33. With this construction, the diameter-enlarged force is further reduced, and the efficiency of the operation is further enhanced.

As described in detail, in the grommet of the present invention, the cylindrical portion is formed on and extends continuously from the smaller outer-diameter portion of the mounting base portion, and the truncated cone-shaped portion is formed only at the distal end of the cylindrical portion. Therefore, it is not necessary to enlarge the diameter of the passage space over a long distance, so that the required diameter-enlarging force is small. Therefore, a cutting operation is not necessary, and besides the grommet can be mounted on any one of various wire harnesses of different outer diameters with a small diameter-enlarging force.

The annular rib is formed on that portion of the outer peripheral surface of the cylindrical portion disposed adjacent to the truncated cone-shaped portion, and therefore when the adhesive tape is wound on the cylindrical portion and the wire harness to fix the grommet to the wire harness, the adhesive tape is engaged with the annular rib, so that the force of retaining of the adhesive tape is enhanced.

The length of the truncated cone-shaped portion in the axial direction is smaller than the length of the cylindrical portion in the axial direction, and therefore the passage space is abruptly reduced only at the distal end portion. With this construction, the truncated cone-shaped portion can be fitted on any one of the various wire harnesses of different outer diameters with a small diameter-enlarging force.

The present invention is based on Japanese Patent Application No. Hei. 10-115183, which is incorporated herein by reference.

While there has been described in connection with the preferred embodiment of the invention, it will be obvious to those skilled in the art that various changes and modifications maybe made therein without departing from the invention, and it is aimed, therefore, to cover in the appended claim all such changes and modifications as fall within the true spirit and scope of the invention.

What is claimed is:

1. A grommet comprising:

a mounting base portion of a different-diameter tubular shape which includes a larger outer-diameter portion formed at one end thereof and a smaller outer-diameter portion at the other end thereof, said larger outer-diameter portion having an annular groove for fitting on a peripheral edge defined by a hole formed through a panel of a vehicle, said mounting base portion defining an insertion space for a wire harness;

a cylindrical portion extending continuously from said smaller outer-diameter portion of said mounting base portion in an axial direction of said mounting base portion; and a truncated cone-shaped portion extending continuously from a distal end of said cylindrical portion, said truncated cone-shaped portion having an open distal end having a diameter smaller than an inner diameter of said cylindrical portion.

2. The grommet according to claim 1, in which said cylindrical portion extends concentric with said mounting base portion.

3. The grommet according to claim 2, in which a length of said truncated cone-shaped portion in an axial direction of said grommet is smaller than a length of said cylindrical portion in the axial direction.

4. The grommet according to claim 1, in which said grommet is applicable for various kinds of wire harnesses having different diameters including a wire harness having a maximum diameter and a wire harness having a minimum diameter, in which said cylindrical portion having an inner diameter corresponding to said wire harness having the maximum diameter thereof, and said open distal end having an inner diameter corresponding to said wire harness having the minimum diameter.

5. The grommet according to claim 4, in which a length of said truncated cone-shaped portion in an-axial direction of said grommet is smaller than a length of said cylindrical portion in the axial direction.

6. The grommet according to claim 1, in which an annular rib is formed on a portion of an outer peripheral surface of said cylindrical portion where is disposed adjacent to said truncated cone-shaped portion.

7. The grommet according to claim 6, in which a length of said truncated cone-shaped portion in an axial direction of said grommet is smaller than a length of said cylindrical portion in the axial direction.

8. The grommet according to claim 1, in which a length of said truncated cone-shaped portion in an axial direction of said grommet is smaller than a length of said cylindrical portion in the axial direction.

* * * * *